Feb. 2, 1965     W. B. HARRISON, JR     3,168,306
APPARATUS FOR ASSOCIATING RELATED SHEETS FROM SEPARATE STACKS
Filed Nov. 1, 1961     5 Sheets-Sheet 1

INVENTOR
WILLIAM B. HARRISON, JR.
BY
ATTORNEYS.

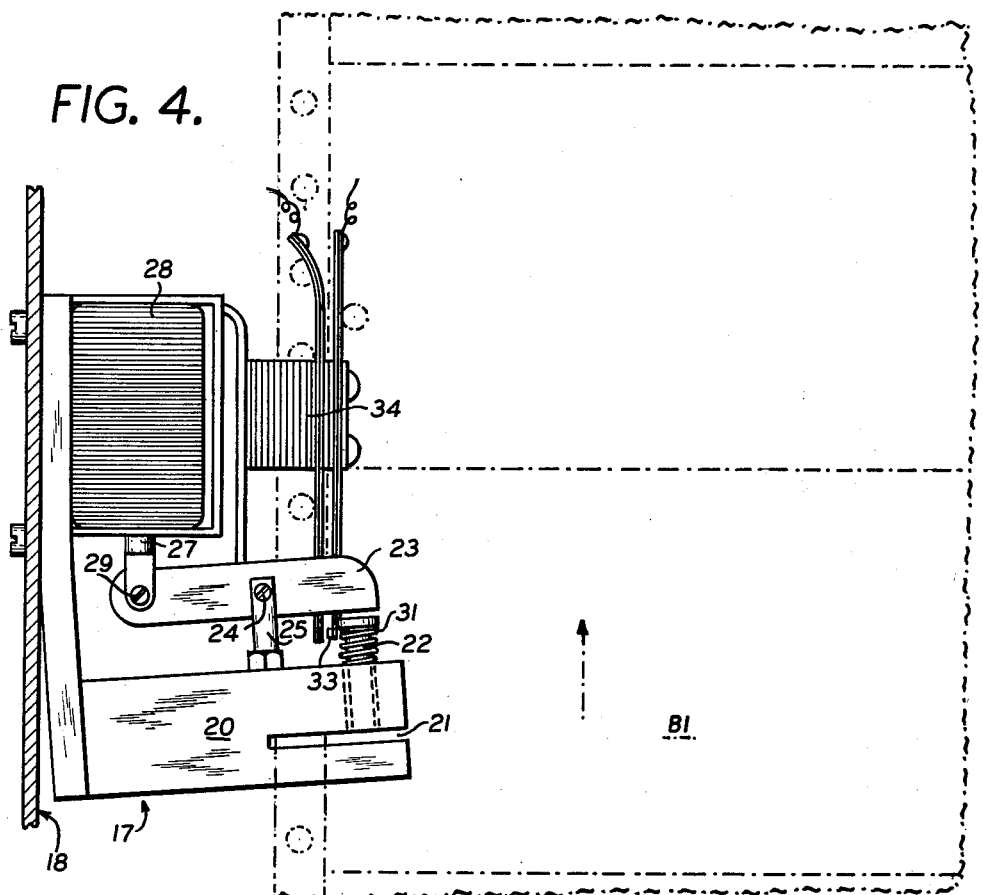
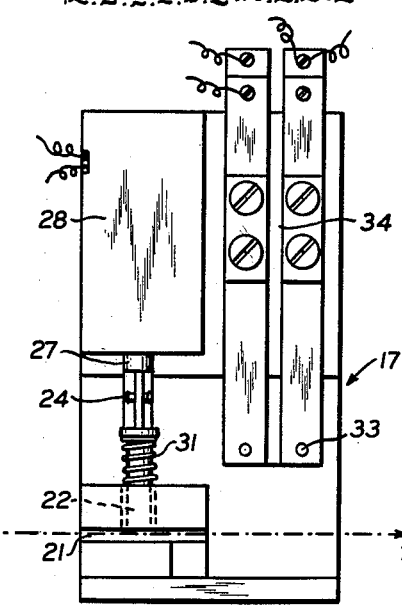

Feb. 2, 1965   W. B. HARRISON, JR   3,168,306
APPARATUS FOR ASSOCIATING RELATED SHEETS FROM SEPARATE STACKS
Filed Nov. 1, 1961   5 Sheets-Sheet 3

INVENTOR
WILLIAM B. HARRISON, JR.

BY
ATTORNEYS.

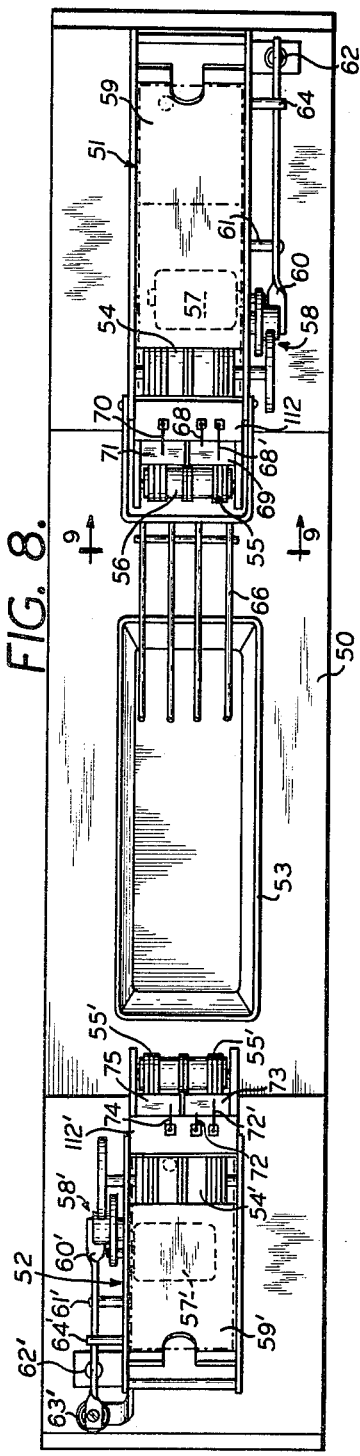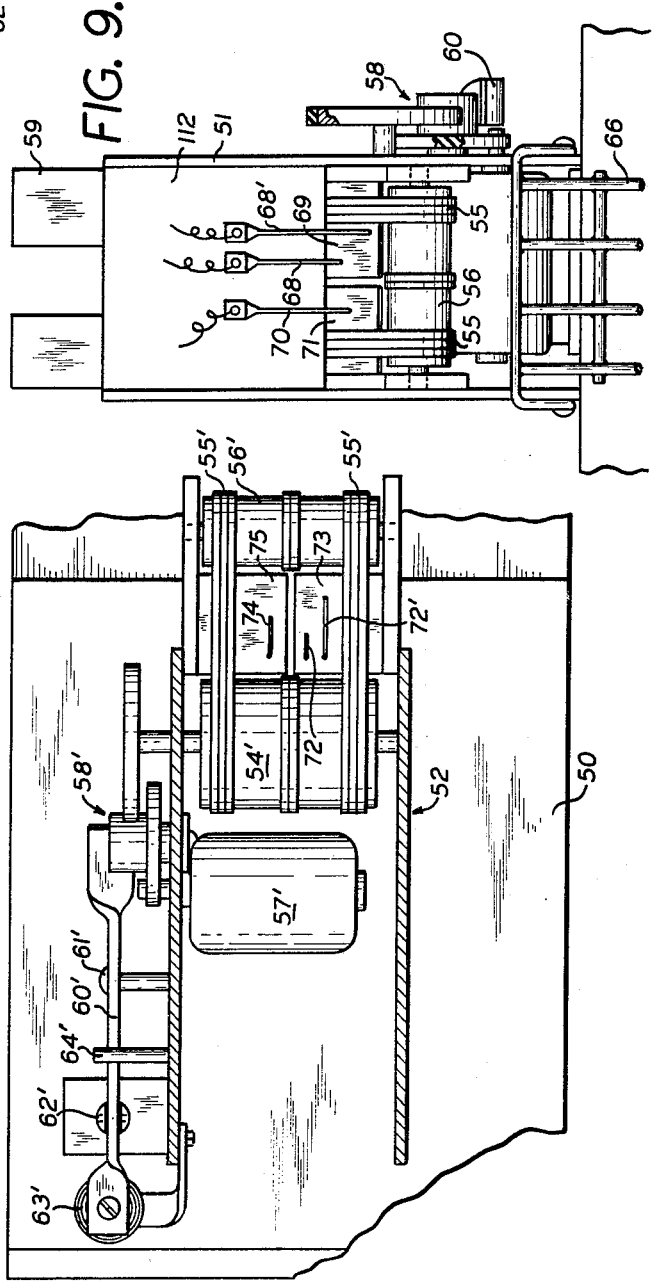

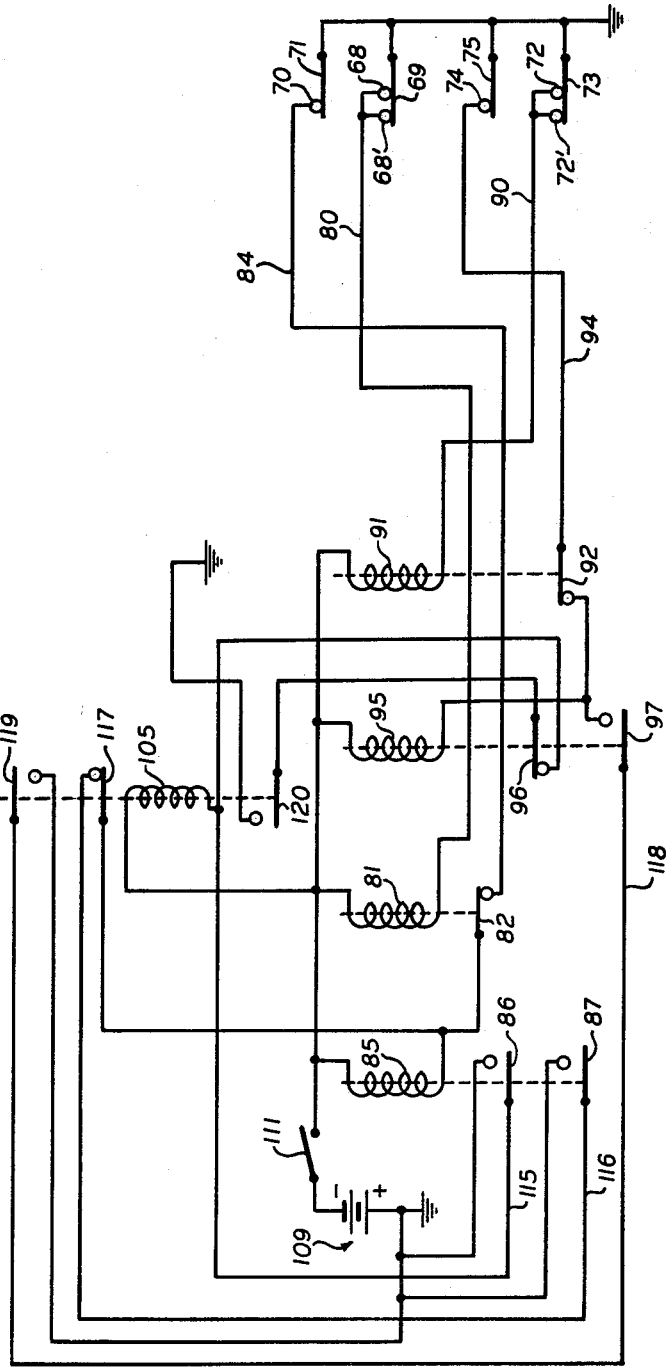

United States Patent Office

3,168,306
Patented Feb. 2, 1965

3,168,306
APPARATUS FOR ASSOCIATING RELATED
SHEETS FROM SEPARATE STACKS
William B. Harrison, Jr., 6 Lee Road, Dryden, N.Y.
Filed Nov. 1, 1961, Ser. No. 149,311
7 Claims. (Cl. 270—58)

This invention relates to collating apparatus and aims to provide for the automatic handling of business records which are arranged in groups of stacked sheets, wherein the respective sheets of a first group may have a set containing one or more related sheets in a second group, whereby the sheets are selectively withdrawn from said groups in such manner that any set of sheets in the second group which bears a specified relationship to a sheet in the first group is sequentially associated therewith.

It is a particular object of my invention to provide means whereby the monthly statements submitted by a telephone company to its subscribers can be more readily assembled. Such statements conventionally include one or two parts. One part, which shows the total amount billed, is a sheet setting forth the service charge to the customer and, if there be any toll charges incurred by the customer during the billing period, the amount thereof. Such monthly statements include a second part only when toll charges have been incurred and this second part consists of a set of one or more slips of paper, depending upon the number of toll charges incurred, setting forth detailed information respecting the individual toll charges. When no toll charges have been incurred, the statement submitted to the customer consists of a single sheet of paper.

The bills and toll slips may be prepared on accounting machines such as the Type 402 accounting machine marketed by International Business Machines Corporation. The subscriber's bills are printed and delivered from such an accounting machine in a stack wherein the bills follow the sequence in which the information relating thereto is fed into the machine. The slips constituting the memoranda for the toll charges, if any, included in such bills are printed and delivered from the machine in a separate stack and in the same order as the bills. In the past it has been necessary to collate the bills and toll slips by hand, segregating the sets of toll slips and associating them physically with the respective bills to which they relate. Such a procedure is expensive and time-consuming.

I have discovered that it is possible to collate with the individual telephone bills the toll charge slips, if any, associated therewith as an automatic operation. This is accomplished in accordance with my invention by placing the stack of sheets constituting the bills in one hopper and the stack of sheets constituting the toll charges in a second hopper. Means are provided for selectively delivering the lowermost sheet in said hoppers to a receiving tray. The selection of the hopper from which a sheet is delivered is effected through sensing means which are controlled by the sheets as they are respectively delivered from the hoppers. When a sheet under delivery from the first hopper has a related set in the second hopper, delivery from that first hopper will be interrupted and the related set will be delivered from the second hopper. After such related set has been delivered, delivery from the first hopper will be resumed and continued until a succeeding sheet under delivery from the first hopper has a related set in the second hopper. Thus, each sheet containing the statement of charges submitted to a customer during a billing period will have physically grouped therewith, as an automatic operation, the toll slips, if any, constituting a memorandum of the toll calls made by that customer during that billing period. The apparatus through which this is accomplished in the practice of my invention is relatively inexpensive and easy to install and maintain, and it does not occupy much room.

A specific embodiment of collating apparatus which may be used in the practice of my invention in the form which I now prefer as illustrated schematically in the accompanying drawings in which:

FIG. 4 is a front elevation of an indexing punch;

FIG. 5 is a plan view of the punch illustrated in FIG. 4;

FIG. 8 is a plan view of the apparatus illustrated in FIG. 7;

FIG. 9 is a section along the lines 9—9 of FIG. 8;

FIG. 10 is a section along the lines 10—10 of FIG. 7; and

FIG. 11 is a diagram of the wiring circuit in the collating apparatus illustrated in FIGS. 7–10, inclusive.

Figure 1:
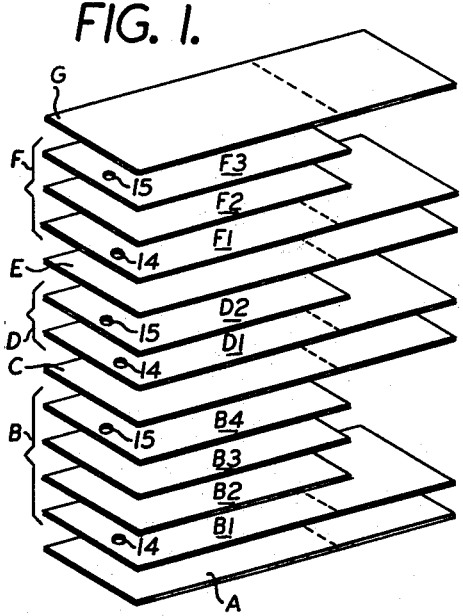
FIG. 1 illustrates a pile of collated bills and toll statements.
Figure 6:
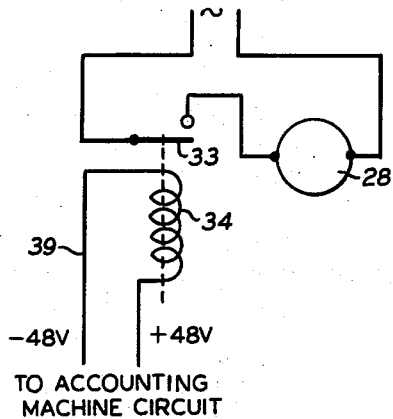
FIG. 6 is a diagram of an indexing circuit.
Figure 2:
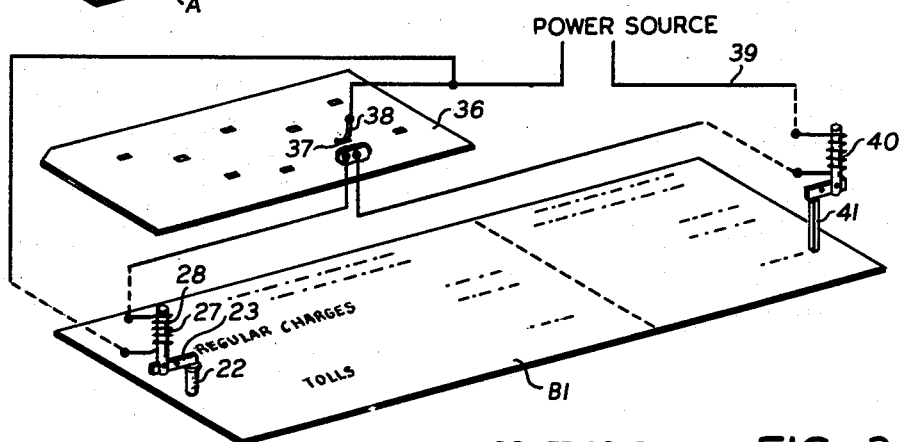
FIG. 2 illustrates diagrammatically the indexing of a bill.
Figure 3:
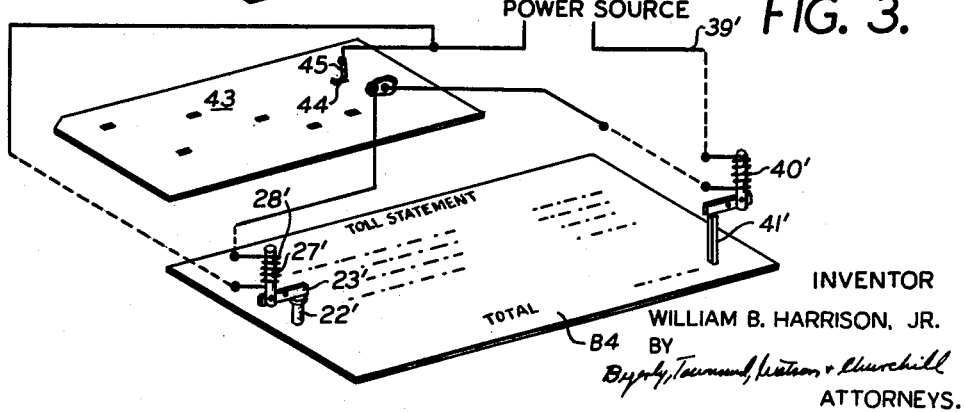
FIG. 3 illustrates diagrammatically the indexing of a toll statement.
Figure 7:
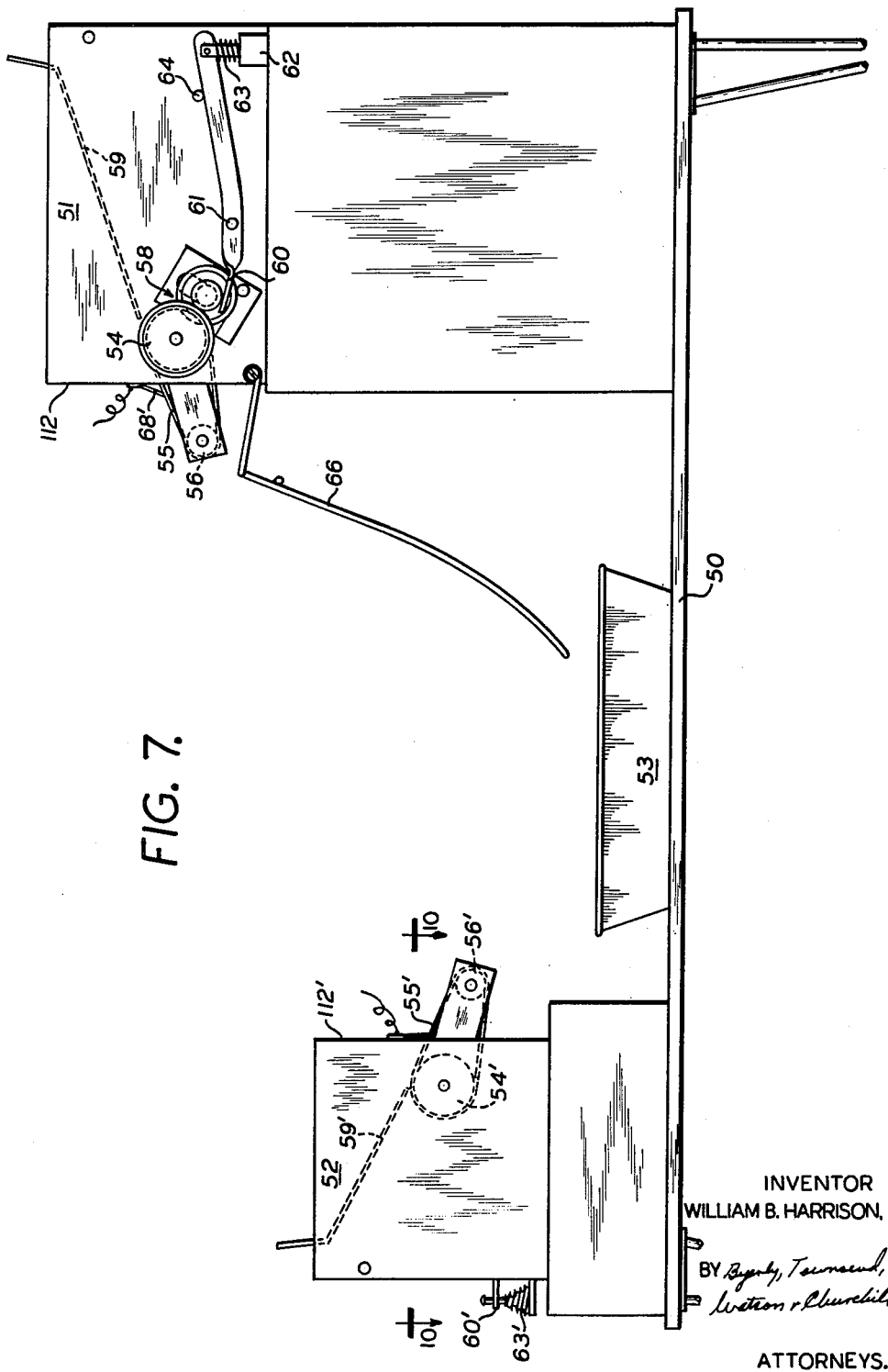
FIG. 7 is a side elevation of collating apparatus embodying my invention.

The business records illustrated in FIG. 1 represent a group of monthly statements collated for transmission to telephone subscribers. The first of these statements consists of a single sheet A which constitutes a bill for service charge to a customer who has not made any toll calls during the billing period. The second statement, collectively designated B, has a bill B1 which includes both toll and service charges and which is accompanied by the toll slips B2, B3 and B4 which contain the data relating to the individual toll calls included in the charge set forth on B1. The statements C, E and G, like statement A, are for service charges alone. The statements D and F include toll charges as well as a service charge and the bills D1 and F1 are accompanied, respectively, by toll slip D2 and toll slips F2 and F3. It will be noted that each of the bills B1, D1 and F1 contains near one end, for a purpose to be explained hereinafter, an index 14 consisting of a perforation. Also, the last member of each set of toll slips, namely, the sheets B4, D2 and F3, contains near one end an index 15 consisting of a perforation.

The bill B1 is perforated to provide index 14 by means of punch 17 which is attached to the Type 402 accounting machine carriage (indicated generally at 18). The punch 17 includes a frame 20 having a breach 21 through which the form for bill B1 is fed as such forms travel through the accounting machine. Plunger 22 is mounted below the outer end of an arm 23 pivoted at 24 to rod 25 fixed to frame 20. The core 27 of solenoid 28 is attached to the inner end of arm 23 by means of a pivot 29. The plunger 22 is normally held in the open position where it clears breach 21 by means of coil spring 31. The punch is actuated when solenoid 28 is energized, causing arm 23 to be pivoted and forcing plunger 22 across breach 21 against the action of spring 31. The circuit of solenoid 28 includes a switch 33 which is closed through the action of relay 34.

The accounting machine card 36 has a hole 37 therein through which brush 38 closes the circuit 39 which includes solenoid 40. This solenoid operates the mechanism, indicated generally at 41, which prints on the bill the total of toll charges. The circuit which includes solenoid 28 is linked to the circuit 39 so that plunger 22 is actuated to punch a perforation through bill B1 to provide index 14 when a toll charge is included in the entries on bill B1.

The apparatus for forming a perforation to provide index 15 in toll slip B4 is similar to punch 17. It includes a plunger 22' mounted on arm 23' which carries the core 27' of solenoid 28'. The accounting card 43 is provided with a hole 44 through which brush 45 extends to close the circuit 39' containing solenoid 40'. When the circuit 39' is closed solenoid 40' is energized, actuating apparatus 41' which prints the total of the toll charges included in the set of slips of which B4 is the last. At the same time, solenoid 28' is energized to depress plunger 22' which perforates toll slip B4.

The apparatus through which the bills and toll slips are collated after they are printed and indexed includes a table 50 that supports bill hopper 51, toll slip hopper 52 and receiving tray 53.

The hopper 51 includes a tray 59 that slopes downwardly toward drive roller 54. Conveyor belts 55 which travel around idler roller 56 are driven by roller 54. A constant speed motor 57 is connected through a friction clutch 58 with drive roller 54 to rotate the same. Rotation of drive roller 54 can be arrested while motor 57 is in operation through the action of a brake 60 pivoted at 61 to the side of hopper 51 and actuated by solenoid 62. The brake 60 is normally held in released position by a coil spring 63 which urges it against stop 64 mounted in the side of hopper 51. A chute 66 extends from a point below idler roller 56 to a point above receiving tray 53. Associated with hopper 51 are a pair of brushes 68, 68' which normally make contact with conductor 69, and brush 70 which normally makes contact with conductor 71. It will be noted that the brushes are of different lengths, brush 68 being shortest, brush 68' being longest, and brush 70 being of intermediate length so that the points at which those brushes make contact with their respective conductors are longitudinally spaced.

The mechanism through which delivery is made from hopper 52 is similar to the delivery mechanism which is used with hopper 51. It includes a tray 59' that slopes downwardly toward drive roller 54'. Conveyor belts 55' which travel around idler roller 56' are driven by roller 54'. A constant speed motor 57' is connected through a friction clutch 58' with drive roller 54' to rotate the same. Rotation of drive roller 54' can be arrested while motor 57' is in operation through the action of a brake 60' pivoted at 61' to the side of hopper 52 and actuated by solenoid 62'. The brake 60' is normally held in released position by a coil spring 63' which urges it against stop 64' mounted in the side of hopper 52. Associated with hopper 52 are a pair of brushes 72, 72' which normally make contact with conductor 73, and brush 74 which normally makes contact with conductor 75. It will be noted that these brushes are of different lengths, brush 72 being shortest, brush 72' being longest, and brush 74 being of intermediate length so that the points at which those brushes make contact with their respective conductors are longitudinally spaced.

The brushes 68, 68' and the conductor 69 form part of a circuit 80 that includes relay 81 which when actuated opens normally closed switch 82. The brush 70 and conductor 71 form part of a circuit 84 that includes relay 85 which when actuated closes normally open switches 86 and 87. The brushes 72, 72' and conductor 73 form part of a circuit 90 that includes relay 91 which when actuated opens normally closed switch 92. Brush 74 and conductor 75 form part of a circuit 94 that includes relay 95 which when actuated opens normally closed switch 96 and closes normally open switch 97. The solenoids 62, 62' are in a circuit 100 that is regulated by the switch 101. That switch normally occupies the position illustrated in FIG. 11 where it closes the circuit containing solenoid 62' and it is shifted to the position where the circuit containing solenoid 62' is opened and the circuit containing solenoid 62 is closed when the relay 105 is actuated. The circuit 100 is connected with power source 107. Power for the circuits 80, 84, 90 and 94 is supplied by battery 109.

The operation of the collating apparatus illustrated in FIGS. 7–11, inclusive, is as follows:

Bills for a selected number of customers, stacked in the order in which they are delivered from the accounting machine, are placed in hopper 51. The toll slips for those same customers, stacked in the same order, which is the way they are delivered from the accounting machine, are placed in hopper 52. Switches 110 and 111 are closed manually and the motors 57 and 57' are placed in operation. However, since the switch 101 is then in the position illustrated in FIG. 11, solenoid 62' actuates brake 60' to prevent rotation of drive roller 54' and delivery is limited to bills in hopper 51 which is served by belt 55 and drive roller 54. When the collating apparatus commences to operate, each of the brushes 68, 68', 70, 72, 72' and 74 makes contact with that one of the conductors 69, 71, 73 and 75 which is associated therewith. When switch 111 is first closed, relays 81 and 91 operate but relays 85 and 95 do not.

As motor 57 drives roller 54 the conveyor belts 55 draw the lowermost bill from the pile in hopper 51. The front wall 112 of hopper 51 prevents more than one bill from being withdrawn from the hopper at a time and it may be provided with a roughened surface at its lower edge for this purpose. As a bill is withdrawn from hopper 51 it insulates brushes 68, 70 and 68', in that order, from their respective conductors, 69 and 71. If that bill does not have any index 14, there is no change in the position of switch 101, the connection between motor 57 and drive roller 54 is not affected and delivery from hopper 51 continues. However, if the bill under delivery from hopper 51 should contain an index 14, the perforation provided thereby will permit the brush 70 to make contact with its conductor 71 while the brushes 68, 68' are insulated from their conductor 69 and as relay 81 is in the released state when this occurs, switch 82 is then in closed position. As a result, relay 85 operates to close switch 86, thereby closing circuit 115, and causing relay 105 to operate. Relay 85 also closes switch 87 in line 116 which provides a locking circuit for relay 85 until normally closed switch 117 is opened through the operation of relay 105. When relay 105 operates, it closes normally open switch 120 which provides a locking circuit for that relay so long as switch 96 is closed.

The switch 101 is shifted through the operation of relay 105 from the position shown in FIG. 11 to the position in which the circuit containing solenoid 62' is opened and the circuit containing solenoid 62 is closed. This causes brake 60' to be released and also causes brake 60 to arrest the rotation of drive roller 54 by its motor 57 so that further advance of the bill then under delivery from hopper 51 is interrupted. The locking circuit 116 for relay 85 causes that relay to remain in operation until relay 105 operates even though switch 82 is opened by relay 81 when the inertia of the delivery mechanism moves the bill under delivery from hopper 51, before it is completely stopped through the action of brake 60, to a point where that bill no longer insulates brush 68 from its conductor 69.

While brake 60' is released, drive roller 54' causes belts 55' to deliver the lowermost toll slip from hopper 52. The front wall 112' of hopper 52 prevents more than one toll slip from being withdrawn from that hopper at a time and it may be provided with a roughened surface at its lower edge for this purpose. As a toll slip is withdrawn from hopper 52 it insulates brushes 72, 74 and 72', in that order, from their respective conductors, 73, and 75. If that toll slip does not have any index 15, switch 101 is not moved from the position it then occupies, the connection between motor 57' and drive roller 54' is not affected and delivery from hopper 52 continues. However, if the toll slip under delivery from hopper 52 should contain an index 15, the perforation provided thereby will permit the brush 74 to make contact with its conductor 75 while the brushes 72 and 72' are insulated from their conductor 73, and as relay 5 is in the released state when this occurs, switch 92 is then in closed position. As a result, relay 95 is actuated to open switch 96 and the locking circuit of relay 105 is thus opened. When relay 95 operates, it also closes switch 97 in circuit 118 which includes switch 119 that is closed, when relay 105 operates, providing a locking circuit for relay 95. Relay 105 is of the slow release type and does not open the circuit containing solenoid 62 until after the toll statement then under delivery has been withdrawn from hopper 52 and deposited in receiving tray 53. When relay 105 is released, switch 120 is opened, relay 91 operates to open switch 92 by virtue of the fact that the circuit 90 is then closed and relay 95 is released. Solenoid 62 is released and the bill whose delivery was arrested in the manner described above is then desposited in receiver 53 by the resumed operation of belts 55. The succeeding bill is next withdrawn from hopper 51 by belts 55 and the cycle of operation as thus described continues until switches 110 and 111 are opened manually. It will, of course, be appreciated that the dimensions of the set of brushes, 68, 68', 70, and of the set of brushes, 72, 72', 74, and the speed at which the bills and toll slips are conveyed through the collating apparatus are such that the successive bills and toll slips will not interfere with each other so as to altar the cycle of operations that I have described.

The terms that I have used in describing the specific embodiment of my invention that I now prefer, and which is illustrated in the accompanying drawings, are terms of description and not of limitation. It is to be understood that modifications may be made in the specific embodiment of my invention that I have described without departing from the spirit of my invention as it is defined in the appended claims. For instance, accounting machines other than the Type 402 accounting machine referred to in the foregoing description can be readily employed in the preparation of the records that are collated in accordance with my invention, and the index 14 or 15 that is applied to the bills and toll slips may be formed with ink whereupon the specific sensing mechanism which I have described may be appropriately modified in known manner to accommodate such change and still achieve the desired result.

What I claim is:

1. Apparatus for collating related groups of business records in sheet form, comprising:
   a receiving tray;
   a first feed hopper adapted to hold a group of indexed sheets and unindexed sheets stacked in numbered order;
   a second feed hopper adapted to hold a group of sets of sheets, each related to a certain indexed sheet in the first-mentioned group, stacked in a correspondingly numbered order;
   a conveyor associated with each of said hoppers and adapted to remove the lowermost sheet from a selected one of said hoppers and to deliver said sheet directly to the receiving tray; and
   sensing means, including two sets of three longitudinally spaced brushes, each adapted to bear against a stationary contact to close an electric circuit, one set being located in each of the paths of said sheets so that a sheet under delivery to the receiving tray is adapted to insulate selectively from their respective contacts the brushes of the set located in the path of that sheet as it travels from said selected hopper as they are respectively delivered from the hoppers, for selecting the hopper from which the next sheet is delivered so that when an indexed sheet is under delivery from the first hopper, delivery from said first hopper will be interrupted when the index on said sheet reaches the point between one of said brushes and its contact and the said related set will be delivered from the second hopper, whereupon delivery from said first hopper will be resumed and continued until a succeeding indexed sheet is under delivery therefrom.

2. Apparatus for collating telephone bills and associated toll slips in sheet form, comprising:
   a receiving tray;
   a bill feed hopper adapted to hold a group of sheets of indexed bills and unindexed bills stacked in numbered order;
   a toll slip feed hopper adapted to hold sets of sheets of toll slips, each related to a certain indexed bill in the bill hopper, and stacked in a correspondingly numbered order;
   a conveyor associated with each of said hoppers and adapted to remove the lowermost sheet from a selected one of said hoppers and to deliver said sheet directly to the receiving tray; and
   sensing means, including two sets of three longitudinally spaced brushes, each adapted to bear against a stationary contact to close an electric circuit, one set being located in each of the paths of said sheets so that a sheet under delivery to the receiving tray is adapted to insulate selectively from their respective contacts the brushes of the set located in the path of that sheet as it travels from said selected hopper as they are respectively delivered from the hoppers, for selecting the hopper from which the next sheet is delivered so that when an indexed bill is under delivery from the bill hopper, delivery from said bill hopper will be interrupted when the index on said bill reaches the point between one of said brushes and its contact and the said related set will be delivered from the toll slip hopper, whereupon delivery from said bill hopper will be resumed and continued until a succeeding indexed bill is under delivery therefrom.

3. Apparatus for collating related groups of business records in sheet form, comprising:
   a receiving tray;
   a first feed hopper adapted to hold a group of indexed sheets and unindexed sheets stacked in numbered order;
   a second feed hopper adapted to hold a group of sets of sheets, each related to a certain indexed sheet in the first-mentioned group, stacked in a correspondingly numbered order;
   a conveyor belt associated with each of said hoppers and adapted to remove the lowermost sheet from its hopper and to deliver said sheet directly to the receiving tray;
   a constant speed motor having a driving connection with each of said conveyor belts;
   a brake associated with each of said driving connections and adapted to be applied to arrest movement of the conveyor belt associated with the driving connection to which a brake is applied; and
   sensing means, including two sets of three longitudinally spaced brushes, each adapted to bear against a stationary contact to close an electric circuit, one set being located in each of the paths of said sheets so that a sheet under delivery to the receiving tray is adapted to insulate selectively from their respective contacts the brushes of the set located in the path of that sheet as it travels from said selected hopper as they are respectively delivered from the hoppers, for selecting the brake which is applied to its associated driving means so that when an indexed sheet is under delivery from the first hopper, the brake associated with the conveyor belt for the first hopper is applied, the brake associated with the conveyor belt for the second hopper is released, and the said related set will be delivered from the second hopper, whereupon the brake associated with the conveyor belt for the second hopper will be applied, and the brake associated with the conveyor belt for the first hopper will be released until a succeeding indexed sheet is under delivery therefrom.

4. Apparatus for collating related groups of business records in sheet form, comprising:
a receiving tray;
a first feed hopper adapted to hold a group of indexed sheets and unindexed sheets stacked in numbered order;
a second feed hopper adapted to hold a group of sets of sheets, each related to a certain indexed sheet in the first-mentioned group, stacked in a correspondingly numbered order;
a conveyor belt associated with each of said hoppers and adapted to remove the lowermost sheet from its hopper and to deliver said sheet directly to the receiving tray;
a constant speed motor having a driving connection with each of said conveyor belts;
means for interrupting each of said driving connections;
a power source;
a pair of solenoids respectively adapted, when connected to said power source, to actuate one of said interrupting means;
a switch adapted to close and open a connection between said power source and the respective solenoids alternately;
a relay adapted to actuate said switch; and
sensing means including a brush and associated contact located in the path of the sheets from said first hopper, controlled by said sheets as they are respectively delivered from the hoppers, for operating said relay so that when an indexed sheet is under delivery from the first hopper, the relay is actuated when the index on said sheet reaches the point between said brush and its contact to move the switch to the position in which the solenoid associated with the conveyor belt for the first hopper is connected with the power source and the said related set is delivered from the second hopper, whereupon the said relay is releasesd and the switch is moved to the position where the other solenoid is connected with the power source and delivery from said first hopper is resumed and continued until a succeeding indexed sheet is under delivery therefrom.

5. The collating apparatus of claim 4 in which the relay is a slow release relay whereby the solenoid associated with the conveyor belt for the second hopper is not connected with the power source until after the set of sheets under delivery from said second hopper is conveyed to the receiver.

6. The collating apparatus of claim 4 in which the sensing means includes:
a circuit connecting the relay to a power source; and
a set of brushes and associated conductors located in the path of the sheets in the first hopper as they are conveyed to the receiver,
one of said brushes being adapted to contact its associated conductor while the others of said brushes are insulated from their associated conductors, whereby said circuit connecting the relay to its power source is closed and the relay operates to move the switch to the position in which the solenoid associated with the conveyor belt for the first hopper is connected with its power source.

7. The collating apparatus of claim 4 in which the sensing means includes:
a circuit connecting said relay to a power source; and
a set of brushes and associated conductors located in the path of the sheets in the second hopper as they are conveyed to the receiver,
one of said brushes being adapted to contact its associated conductor while the others of said brushes are insulated from their associated conductors, whereby said circuit connecting the relay to its power source is opened and the relay releases to move the switch to the position where the solenoid associated with the second hopper is connected with its power source.

References Cited in the file of this patent
UNITED STATES PATENTS

| | | |
|---|---|---|
| 1,976,600 | Carrol | Oct. 9, 1934 |
| 2,213,123 | Guilbert | Aug. 27, 1940 |
| 2,427,839 | Davidson | Sept. 23, 1947 |
| 2,445,636 | Rubidge et al. | July 20, 1948 |
| 2,862,555 | Jurgens et al. | Dec. 2, 1958 |
| 3,023,952 | Thomas | Mar. 6, 1962 |